United States Patent [19]

Allen et al.

[11] Patent Number: 4,652,287

[45] Date of Patent: Mar. 24, 1987

[54] APPARATUS FOR FORMING SOLID CARBON DIOXIDE

[75] Inventors: Charles B. Allen, Downers Grove; Scott T. Madsen, Burr Ridge, both of Ill.; William L. Baradice, Jr., Dunwoody, Ga.

[73] Assignee: The BOC Group, Inc., Montvale, N.J.

[21] Appl. No.: 643,586

[22] Filed: Aug. 23, 1984

[51] Int. Cl.$^4$ .............................................. F25D 3/12
[52] U.S. Cl. ........................................... 62/35; 62/10
[58] Field of Search ................... 62/10, 12, 8, 35, 76, 62/347, 384; 204/157.1 S; 239/14, 3.5

[56] References Cited

U.S. PATENT DOCUMENTS 3,786,644  1/1974  Rich et al. ............................... 62/35
4,166,364  9/1979  Ruprecht et al. ........................ 62/35

Primary Examiner—Frank Sever
Attorney, Agent, or Firm—David A. Draegert; Larry R. Cassett; David L. Rae

[57] ABSTRACT

A substantially uniform blanket of solid carbon dioxide (i.e., snow) is formed by introducing a plurality of low velocity streams of $CO_2$ solid and gas generally downwardly into a funnel section which exhibits an increasing, generally rectangular cross-sectional area in the direction of flow of the $CO_2$ streams. Baffle means are provided in the upper reaches of the funnel section and are effective to initially separate the $CO_2$ streams introduced into the funnel section from one another and to cause the resulting solid carbon dioxide to fall generally downwardly and uniformly throughout the cross-sectional area of the funnel section to thereby form a substantially uniform blanket of $CO_2$ snow in a container for products to be refrigerated.

15 Claims, 4 Drawing Figures

APPARATUS FOR FORMING SOLID CARBON DIOXIDE

BACKGROUND OF THE INVENTION

The present invention relates to methods and apparatus for producing carbon dioxide snow and more particularly, to methods and apparatus for depositing a substantially uniform blanket of $CO_2$ snow over a relatively large surface area.

Carbon dioxide has been extensively used as a refrigerant for both feezing and chilling items of food such as red meat, poultry, vegetables, etc. It is well known to utilize carbon dioxide in the solid phase as a refrigerant and to form solid $CO_2$, i.e. snow, by expanding a flow of liquid carbon dioxide through a nozzle with the resulting drop in pressure effecting a phase change to solid and gaseous $CO_2$. The solid $CO_2$ or snow will exhibit a temperature of $-109°$ F. and may be directed downwardly upon items to be frozen or chilled while the resulting $CO_2$ vapor is exhausted by means of a suction blower or other suitable device.

In order to control streams of $CO_2$ snow, devices commonly known as snow horns have been developed. In these devices, a nozzle is disposed so as to emit a stream of solid-gaseous $CO_2$ into a cylindrical horn section having one end thereof closed while the other end is open so as to enable the solid-gaseous $CO_2$ stream to be emitted therefrom in a particular direction. Generally, such snow horn devices are mounted vertically with the bottom end being open so that solid $CO_2$ may be deposited under gravity onto items to be refrigerated or chilled. For example, it is known to utilize a pair of snow horns, each adapted to receive a supply of liquid $CO_2$ to deposit solid $CO_2$ onto items to be refrigerated which are contained in a carton or other similar sized container. Typically, food products are chilled in this manner, and upon sealing the container, food products may be shipped as a "fresh" food product which is maintained at a temperature slightly above the freezing point thereof by virtue of refrigeration supplied by the $CO_2$ snow. It has been found that these types of chilling systems are effective in supplying carbon dioxide throughout relatively small cartons, i.e. $18'' \times 28''$ and about 10'' deep. Typically, the pair of snow horns utilized in this system are enclosed in a hood which is adapted to enable the resulting $CO_2$ vapors to be exhausted from the area immediately surrounding the container.

Recently, food processors have found it economical to transport and/or store one or more food products such as red meat, poultry, etc. in a relatively large container commonly referred to as a "combo". These containers are typically about $42'' \times 50''$ and about $30''-36''$ deep. It is known to attempt to refrigerate food products such as meat, etc. introduced into these larger containers or combos by concurrently directing $CO_2$ snow from as many as 4-6 snow horns into the container in an effort to uniformly refrigerate the interior thereof. It is important to provide such refrigeration so as to avoid "hot spots" from developing in the container and particularly in corners thereof as bacteria will form almost immediately in these areas and consequently the quality of the food products being transported and/or stored therein is rapidly degraded. Attempts to avoid the occurrence of hot spots include the manual positioning of one or more snow horns to assure that solid carbon dioxide supplied to such containers actually reaches its corners. However, this technique is relatively inefficient and incurs significant labor costs and is not always accurate in assuring that such hot sots do not develop as mentioned above.

In U.S. Pat. No. 4,415,346, there is described a snow horn device wherein liquid $CO_2$ is emitted through an orifice at the upper end of a horn member and impinges interior walls of the horn device. The resulting stream of $CO_2$ solid is deflected downwardly so that it exits the horn device and $CO_2$ vapor is exhausted from the bottom of the horn device into an enclosure surrounding the horn so that the vapor may be removed from the area onto which $CO_2$ snow is to be deposited. The resulting accumulation of $CO_2$ snow, as illustrated FIG. 5 of this patent, is a mound and relatively little $CO_2$ snow will accumulate in the corners of the container therefor. Consequently, the apparatus illustrated in this reference is not considered to be effective to generate a substantially uniform blanket of $CO_2$ snow over a relatively large surface area. A further example of apparatus for forming carbon dioxide snow is illustrated in U.S. Pat. No. 4,287,719. In this apparatus, a J-tube is utilized to form a stream of solid $CO_2$ by separating the solid and gaseous phases of a mixed phase stream and in turn directing the substantially solid $CO_2$ flow into a pair of circular baffles to establish a substantially spiral flow therein. As the streams exit the lower extremity of the circular baffles, the streams interact so as to form larger sized carbon dioxide particles which then descend under gravity downwardly and exit from a larger enclosure surrounding the circular baffles. This reference is primarily concerned with exhausting $CO_2$ vapor to the greatest extent possible and is not concerned with the problems associated with forming uniform blankets of solid carbon dioxide.

Accordingly, in order to adequately refrigerate relatively large containers for products such as food, etc., there is a clear requirement for methods and apparatus for forming substantially uniform blankets of solid carbon dioxide throughout such containers. More particularly, there is a need for methods and apparatus for effectively converting a point source discharge of solid/gas carbon dioxide into an essentially rectangular configuration but in such a manner that the resulting pattern of solid carbon dioxide exists as a blanket that extends uniformly over the desired rectangular area. It is to this end that the present invention is directed as will be seen from the subsequent detailed description thereof.

OBJECTS OF THE INVENTION

It is an object of the present invention to provide improved methods and apparatus for dispensing solid carbon dioxide.

It is another object of the present invention to provide improved methods and apparatus for depositing a substantially uniform blanket of carbon dioxide snow.

It is yet another object of the present invention to provide improved methods and apparatus for depositing a substantially uniform blanket of solid carbon dioxide over a relatively large surface area while minimizing the number of snow horns required therefor.

It is still another object of the present invention to provide improved methods and apparatus for introducing solid carbon dioxide into corners of a generally rectangular container for items to be refrigerated.

It is a still further object of the present invention to provide improved methods and apparatus for introducing carbon dioxide into a container in a manner such that bacteria formation therein may be significantly reduced.

It is yet a further object of the present invention to provide improved methods and apparatus for forming a substantially uniform blanket of solid carbon dioxide from a plurality of snow horns which discharge a relatively low velocity solid-gaseous $CO_2$ stream.

Other objects of the present invention will become apparent from the following description of exemplary embodiments thereof which follows the novel features will be particularly pointed out in conjunction with the claims appended hereto.

SUMMARY

In accordance with the invention, apparatus for forming a substantially uniform blanket of solid $CO_2$ includes a plurality of snow horns adapted to discharge a solid-gaseous $CO_2$ stream downwardly into the top of a funnel section having an increasing, generally rectangular cross-sectional area in the direction of such $CO_2$ flow. Baffle means are provided in the funnel section and extend generally downwardly from a point between each snow horn device at the top of the funnel section to assure that the resulting $CO_2$ solid and gas stream is spread throughout the funnel section so as to deposit a substantially uniform blanket of $CO_2$ snow in a container or other suitable receptacle disposed therebelow. The funnel section is preferably comprised of four planar side sections connected together at generally rounded corners which are beneficial in assuring that the desired distribution of solid $CO_2$ will occur. In addition, the vertical height of the funnel section is preferably greater than the dimensions, i.e. length or width, at the bottom edges of the funnel section while each bottom edge dimension is preferably at least three times greater than the diameter of the snow horn disposed at the top of the funnel section. An exhaust skirt may depend from the bottom of the funnel section and be provided with suitable apertures to enable removal of $CO_2$ vapor from the vicinity of the discharge of the funnel section. Furthermore, the apparatus according to the invention may be spaced 24" or so above a container which is to receive a uniform blanket of $CO_2$ snow produced by such apparatus in order to enable products therein to be refrigerated thoroughly.

In a preferred embodiment of the apparatus according to the invention, a low velocity solid-gaseous stream of carbon dioxide is formed in each snow horn by the use of a particular snow horn structure as, for example, is illustrated in U.S. Pat. No. 4,111,362 assigned to the assignee (formerly known as Airco, Inc.) of the present invention. As described in this reference, a plurality of intersecting jets of solid/gas carbon dioxide streams are employed to reduce the kinetic energy of each of such streams and thereby assure that a relatively low velocity stream of solid and gaseous $CO_2$ flows downwardly and exits from the snow horn device. In accordance with the invention, the formation of such a stream of solid and gaseous $CO_2$ will, upon contact with the baffle means disposed in the funnel section as mentioned above, result in a relatively even distribution of solid $CO_2$ substantially throughout the funnel section and consequently, the formation of a substantially uniform blanket of solid $CO_2$. By sizing the funnel section of the apparatus according to the invention to substantially the dimensions of a container having food product therein to be refrigerated, the resulting blanket of solid carbon dioxide formed in such container will extend substantially throughout and assure that solid carbon dioxide reaches the container corners and thereby precludes the formation of hot spots and the development of bacteria therein.

BRIEF DESCRIPTION OF THE DRAWING

The invention will be more clearly understood by reference to the following description of exemplary embodiments thereof in conjunction with the following drawing in which.

DESCRIPTION OF PREFERRED EMBODIMENT

Figure 1:
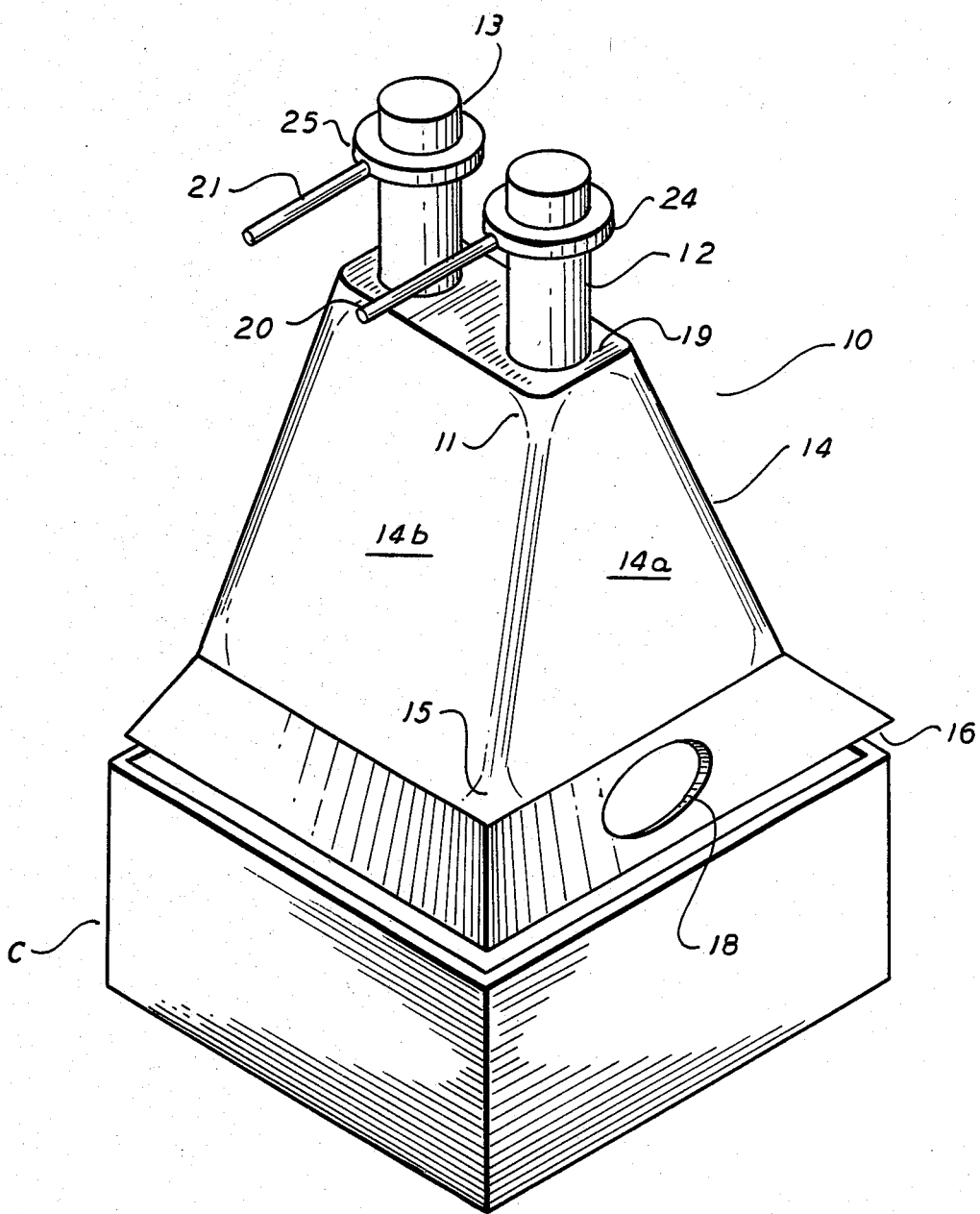
FIG. 1 is an isometric view of apparatus for forming a substantially uniform blanket of solid carbon dioxide according to the invention.

Referring now to FIG. 1 of the drawing, illustrated therein is an exemplary embodiment of apparatus 10 for producing a substantially uniform blanket of carbon dioxide which apparatus is generally comprised of snow horns 12 and 13, funnel section 14, and an exhaust skirt 16. Snow horns 12 and 13 are of a generally cylindrical configuration having the upper end thereof enclosed although the lower end will communicate with the interior of funnel section 14 by means of apertures of appropriate dimensions formed in top section 19 of funnel section 14. Preferably, top section 19 extends across the top of funnel section 14 and is substantially planar. Typically, snow horns 12 and 13 are formed of aluminum or other suitable material and are provided with collars 24 and 25, respectively. Condutis 20 and 21 are provided for supplying liquid carbon dioxide to each of collars 24 and 25. Appropriate valves and pressure gauges, etc, (not shown) are provided in conduits 20 and 21. As the latter devices are well known to those skilled in the art, no further description thereof is believed necessary.

Figure 4:
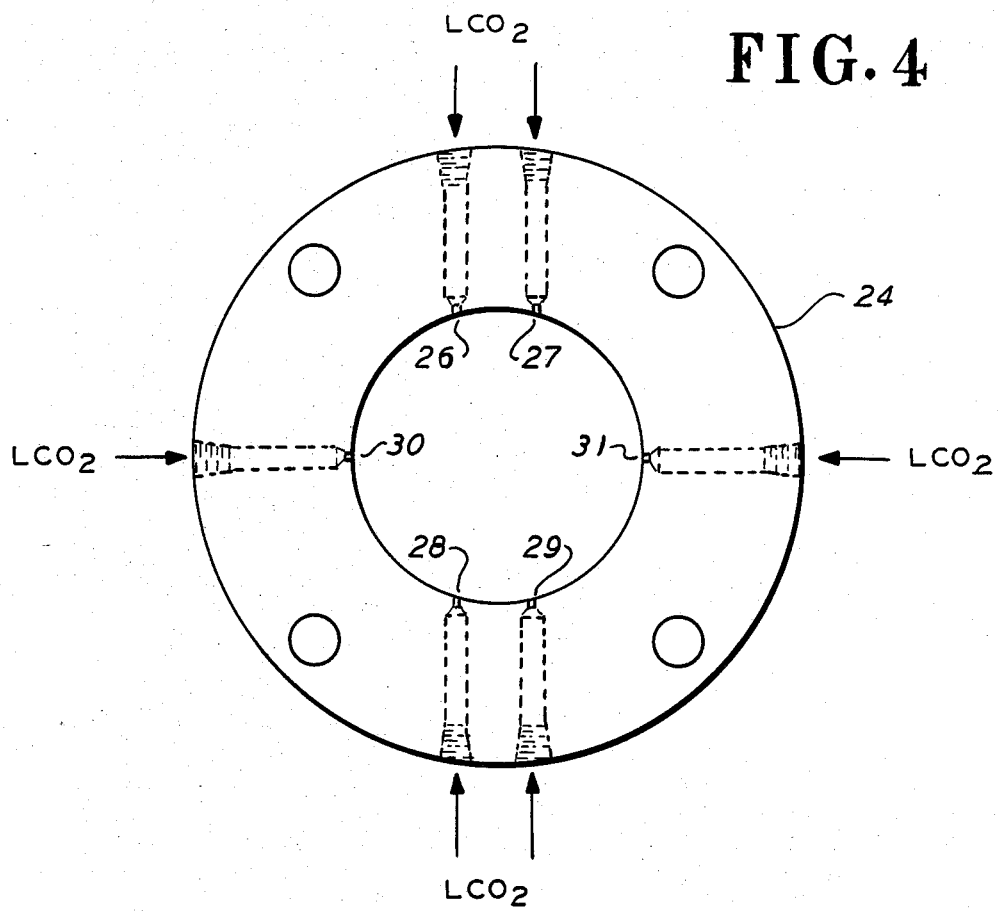
FIG. 4 is a view of suitable nozzle means for forming a relatively low velocity stream of solid and gaseous carbon dioxide in snow horn devices utilized in conjunction with the apparatus according to the invention.

Snow horns 12 and 13 are preferably of the type illustrated in U.S. Pat. No. 4,111,362 and an exemplary embodiment of one of such horns is illustrated in FIG. 4. As will be seen, collar 24 is provided with a plurality of appropriate apertures and nozzles 26–31 so that streams of liquid carbon dioxide may be separately supplied to each such nozzle. Furthermore, as appropriate pairs of nozzles 26, 28 and 27, 29 and 30, 31 are diametrically opposed to one another, the snow-gaseous streams of carbon dioxide emitted from such opposing nozzles will intersect with one another thereby significantly reducing the kinetic energy of such streams so that a relatively low velocity stream of solid-gaseous carbon dioxide will fall downwardly through snow horns 12 and 13 from the height therein corresponding to the location of collars 24 and 25. Although other types of snow horns may be utilized, it is important that any such snow horn be effective to substantially provide the low velocity stream of solid and gaseous $CO_2$ as is formed upon use of the snow horns illustrated in U.S. Pat. No. 4,111,362.

Figure 2:
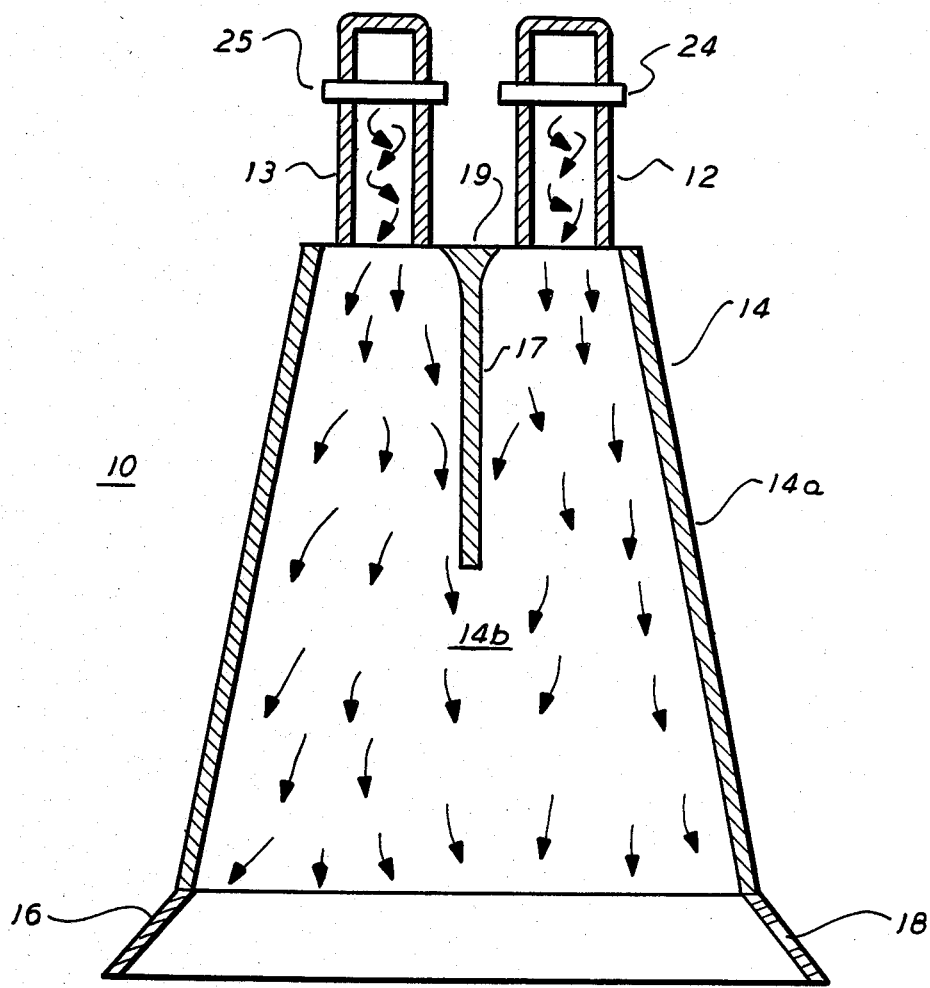
FIG. 2 is a diagrammatic elevational view of the apparatus illustrated in FIG. 1.
Figure 3:
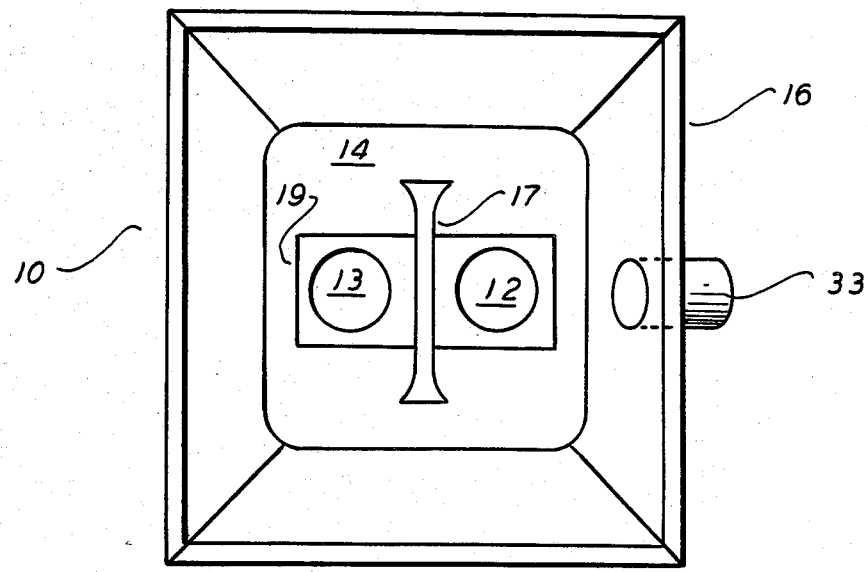
FIG. 3 is a bottom view of the apparatus according to the invention illustrated in FIG. 2.

The term "funnel section" will be employed herein to describe the structure identified by reference number 14 in FIGS. 1–3. Funnel section 14 is typically comprised of four substantially planar sides so as to define a generally increasing, rectangular cross-sectional area in the downward direction of the flow of solid and gaseous $CO_2$ therethrough and top section 19. Two essentially adjacent sides of 14a and 14b are illustrated in FIG. 1 as is a rounded corner 15 at the bottom of these sides. Moreover, it is preferred that the intersection of sides 14a and 14b be as rounded as possible along the length of such intersection upwardly from corner 15 to corner 11 at which point sides 14a and 14b join planar top section 19 of funnel section 14. It has been found that by providing rounded corners between sides of funnel section 14, as typically illustrated in FIG. 1, the resulting distribution of solid carbon dioxide interiorally of funnel section 14 will be substantially uniform and will enable formation of a uniform blanket of solid $CO_2$ to be formed in a container C disposed below apparatus 10 as illustrated in FIG. 1. In addition, it has been found that by forming funnel section 14 with a vertical height at least as great as the length of any bottom edge of side 14a or 14b etc., the ability to produce a substantially uniform blanket of solid carbon dioxide will be enhanced. Furthermore, it has been found that there is a preferred relationship between the length of the bottom edge of each of sides 14a and 14b and the diameter of the horn section of horns 12 and 13. Thus, it is preferred that the diameter of each horn section be less than about one-third of the length of the bottom edge of either side section 14a or 14b. As a consequence of utilizing the aforementioned geometrical relationships between various components of apparatus 10, it has been found that upon forming relatively low velocity streams of solid and gaseous $CO_2$ in snow horns 12, funnel section 14 is particularly effective in generating and depositing a substantially uniform blanket of solid carbon dioxide in a configuration which essentially conforms to the rectangular cross-section of the bottom of funnel section 14. As stated above, by forming such a blanket of solid carbon dioxide, corners of container C disposed below funnel section 14 will receive adequate amounts of solid carbon dioxide and hence hot spots and resulting bacteria formation will be substantially eliminated.

In order to assist in the removal of excess carbon dioxide vapor, an exhaust skirt member 16 may be disposed about the bottom of funnel section 14 as generally illustrated in FIG. 1. Preferably, an aperture 18 is formed in skirt 16 to enable appropriate conduits (not shown) to communicate with the interior of skirt 16 and thus enable carbon dioxide vapor to be exhausted therefrom.

In FIG. 2, there is illustrated an exemplary embodiment of apparatus 10 wherein internal portions of snow horns 12, 13 and of funnel section 14 are illustrated. A baffle 17 is generally disposed to depend from top 19, which extends across the top of funnel section 14, at a location between snow horns 12 and 13 and preferably, midway between each of these snow horns. Preferably, baffle 17 is substantially planar and extends in such a manner so as to divide the upper interior portion of funnel section 14 into two separate volume or compartments. In addition, baffle 17 extends at least about one-third of the vertical distance from top 19 to the bottom of funnel section 14 and preferably about one-half of this distance. By utilizing a planar baffle as mentioned above, the $CO_2$ solid and gas streams entering the upper reaches of funnel section 14, as indicated by arrows depicted in FIG. 2, will be maintained separate from one another in these upper reaches. Furthermore, the kinetic energy remaining in each of these streams will tend to be dissipated as these streams contact baffle 17 and the interior of sides 14a and 14b and upon this loss of kinetic energy, the solid $CO_2$ particles in this stream will tend to fall downwardly to funnel section 14 but evenly distributed over the cross-sectional area thereof. This substantially even distribution of solid carbon dioxide throughout the cross-sectional area of funnel section 14 enables a blanket of such solid carbon dioxide to be formed in a container disposed beneath exhaust skirt 16 as mentioned previously.

Turning now to FIG. 3, there is shown the bottom view of apparatus 10 which particularly illustrates the location of baffle 17 therein. The only structure illustrated in FIG. 3 not previously identified is an exhaust conduit 33 which is disposed to enable carbon dioxide vapor to be exhausted through aperture 18 of skirt member 16. The exhaust of carbon dioxide vapor, however, does not materially interfere with the production of a substantially uniform blanket of solid carbon dioxide as mentioned heretofore.

It will be understood that additional snow horns may be utilized in connection with appropriate baffle members in conjunction with a funnel section as described above in the event it is desired to employ more than two snow horns in connection with such apparatus. In addition, it will be appreciated that carbon dioxide may be deposited as a substantially uniform blanket into and throughout container C illustrated in FIG. 1 as product such as red meat, poultry, etc. is being loaded therein. This blanket of solid carbon dioxide will extend into the corners of container C so that hot spots do not occur in these locations. Typically, the flow rate of liquid carbon dioxide to horns 12 and 13 is set in accordance with the rate at which such products are introduced into container C to assure that sufficient refrigerant in the form of a blanket of solid carbon dioxide is supplied to container C. Also, appropriate means for measuring the temperature of such product as it is being refrigerated, and thereafter, may be utilized as those skilled in the art will appreciate.

In summary, the present invention constitutes an advance in the art of preserving perishables or other products to be refrigerated by assuring that a substantially uniform blanket of refrigerant (solid carbon dioxide) is formed throughout container and that virtually no locations in such container are deficient in the refrigerant. In this manner, hot spots and bacteria growth can be virtually eliminated notwithstanding the relatively large size of certain containers not utilized, for example, in the food processing industry. As mentioned before, by employing snow horns which discharge relatively low velocity $CO_2$ solid and gas streams and a funnel section which, together with appropriate baffle means, assures that a substantially even distribution of solid carbon dioxide is formed throughout the cross-sectional area of the funnel section, enables a substantially uniform blanket of solid carbon dioxide to be deposited throughout a container having a relatively large surface area.

The foregoing and other various changes in form and details may be made without departing from the spirit and scope of the present invention. Consequently, it is intended that the appended claims be interpreted as including all such changes and modifications.

We claim:

1. Apparatus comprising means for producing a blanket of carbon dioxide snow over a generally rectangular area, including a plurality of snow horn means for converting liquid carbon dioxide to streams of gaseous carbon dioxide which is directed downwardly; and funnel means having substantially rectangular cross-section area that increases from top to bottom of said funnel means, a top section having apertures defined therein with each of said apertures being adapted to receive a stream discharged by one of said snow horn means; and baffle means extending downwardly from said top section in said funnel means for maintaining said streams separate from one another in the upper portion of said funnel means, said snow horn means being disposed above and adapted to discharge said stream downwardly into the top of said funnel means wherein said carbon dioxide is substantially uniformly distributed and from which said carbon dioxide is discharged as a substantially uniform blanket over said rectangular area.

2. The apparatus defined in claim 1 wherein said baffle means is substantially planar and extends downwardly for a distance up to approximately one-half of the height of said funnel means.

3. The apparatus defined in claim 1 wherein each of said snow horn means includes a generally cylindrical horn section and a plurality of nozzles each adapted to receive a flow of liquid carbon dioxide with said nozzles being mounted in pairs about the periphery of said horn section with the nozzles of each pair being diametrically opposed to one another such that streams of solid and gaseous carbon dioxide discharged from each nozzle of a pair intersect whereby the kinetic energy of said streams is substantially dissipated.

4. The apparatus defined in claim 1 wherein said funnel means is comprised of four substantially planar side sections with the intersection of any two side sections being in the form of rounded corners.

5. The apparatus defined in claim 1 wherein said plurality of apertures comprises two apertures and said baffle means are substantially planar and extend downwardly from a point of said top section substantially equidistant between said apertures.

6. The apparatus defined in claim 1 additionally comprising an exhaust skirt depending from the bottom of said funnel means, said exhaust skirt having at least one aperture therein to enable carbon dioxide vapors to be exhausted therethrough.

7. Apparatus comprising means for producing a blanket of carbon dioxide snow over a generally rectangular area, including a plurality of snow horn means, each having a generally cylindrical horn section for discharging a stream of gaseous carbon dioxide; and funnel means having a top section with apertures therein each of which is adapted to receive one of said horn sections to enable said stream to be discharged into said funnel means, and side sections defining a substantially rectangular cross-section area which increases from top to bottom of said funnel means with the height of said funnel means being equal to or greater than the longest bottom edge of said side sections.

8. The apparatus defined in claim 7 additionally comprising substantially planar baffle means extending generally downwardly from said top section within said funnel means for maintaining said solid and gaseous carbon dioxide streams separate from one another within the upper portion of said funnel means.

9. Apparatus comprising means for producing a blanket of carbon dioxide snow over a generally rectangular area, including a plurality of snow horn means, each having a generally cylindrical horn section; and funnel means including a top section for enclosing the top of said funnel means, said top section having apertures therein each of which is adapted to receive one of said horn sections to enable said streams to be discharged into said funnel means; and side sections defining a substantially rectangular cross-section area which increases from top to bottom of said funnel means with the shortest bottom edge of any side section being at least three times as great as the diameter of any of said horn sections.

10. The apparatus defined in claim 9 wherein the height of said funnel means is at least as great as the longest bottom edge of any of said side sections.

11. The apparatus defined in claim 9 additionally comprising baffle means extending downwardly from said top section in said funnel means for maintaining said solid and gaseous carbon streams separate from one another in the upper portion of said funnel means.

12. The apparatus defined in claim 11 wherein said baffle means extend downwardly for a distance equal to approximately one-half of the height of said funnel means.

13. Apparatus comprising means for producing a blanket of carbon dioxide snow over a generally rectangular area, including a plurality of snow horn means each of which includes a substantially cylindrical snow horn section and a plurality of nozzles for converting liquid carbon dioxide supplied thereto to a stream of gaseous carbon dioxide, said nozzles mounted in pairs about the periphery of said horn section with each nozzle oriented to discharge a stream of gaseous carbon dioxide in oppositon to the stream discharged by the other nozzle of said pair so that said streams intersect and substantially dissipate the kinetic energy of each of said streams; and funnel means including a top section having apertures therein, each of which is adapted to receive one of said horn sections to enable each of said streams to be discharged into said funnel means, and baffle means extending downwardly from said top section in said funnel means to maintain said streams separate from one another in the upper portion of said funnel such that upon contact between said streams and said baffle means and the interior of said funnel means, the kinetic energy of said streams is further reduced and said streams fall from said funnel means to form said blanket of carbon dioxide snow which exhibits an area corresponding to the cross-section area of said funnel means.

14. The apparatus defined in claim 13 in which three pairs of nozzles are mounted about the periphery of said horn section.

15. The apparatus defined in claim 13 wherein said baffle means is substantially planar and extends downwardly for a distance equal to approximately one-half of the height of said funnel means.

* * * * *

UNITED STATES PATENT OFFICE
CERTIFICATE OF CORRECTION

PATENT NO. : 4,652,287
DATED : March 24, 1987
INVENTOR(S) : Charles B. Allen et al It is certified that error appears in the above-identified patent and that said Letters Patent are hereby corrected as shown below:

Cover Page [75] the name "Baradice" should read -- Paradice --.

Column 1, line 12, "feezing" should read -- freezing --.

Column 2, line 3, "sots" should read -- spots --.

Column 3, line 13, after "follows" insert -- and --.

Column 4, line 41, "Condutis" should read -- Conduits --.

Column 5, line 63, "volume" should read -- volumes --.

Column 6, line 53, "not" should read -- now --.

Column 8, line 40, "oppositon" should read -- opposition --.

Signed and Sealed this

Fifth Day of January, 1988

Attest:

DONALD J. QUIGG

*Attesting Officer*　　　　*Commissioner of Patents and Trademarks*